(12) United States Patent
Mizubata et al.

(10) Patent No.: US 7,410,166 B2
(45) Date of Patent: Aug. 12, 2008

(54) IMAGE READING APPARATUS

(75) Inventors: Tsuyoshi Mizubata, Tokyo (JP); Kiyoshi Hata, Tokyo (JP); Masahiro Ogawa, Yamanashi-ken (JP); Hiroyuki Yamada, Yamanashi-ken (JP); Masaki Higuchi, Yamanashi-ken (JP)

(73) Assignees: Konica Minolta Business Technologies, Inc. (JP); Nisca Corporation (JP)

( * ) Notice: Subject to any disclaimer, the term of this patent is extended or adjusted under 35 U.S.C. 154(b) by 427 days.

(21) Appl. No.: 11/178,163

(22) Filed: Jul. 8, 2005

(65) Prior Publication Data

US 2006/0071386 A1 Apr. 6, 2006

(30) Foreign Application Priority Data

Aug. 20, 2004 (JP) ............................. 2004-241193

(51) Int. Cl.
*B65H 5/00* (2006.01)
(52) U.S. Cl. ................. 271/264; 271/8.1; 271/3.01; 271/3.14; 271/4.01; 271/10.01; 358/498; 399/215; 399/367; 399/498
(58) Field of Classification Search ................. 271/264, 271/8.1, 3.01, 3.14, 4.01, 10.01; 358/498; 399/215, 367
See application file for complete search history.

(56) References Cited

U.S. PATENT DOCUMENTS

| 5,689,793 | A | * | 11/1997 | Kobayashi et al. | .......... 399/374 |
|---|---|---|---|---|---|
| 6,640,082 | B2 | * | 10/2003 | Mitomi | ....................... 399/374 |
| 6,995,880 | B2 | * | 2/2006 | Tohyama et al. | ............ 358/496 |
| 7,020,429 | B2 | * | 3/2006 | Hamada et al. | ............. 399/367 |
| 7,021,619 | B2 | * | 4/2006 | Watanabe et al. | .......... 271/3.14 |
| 2003/0047862 | A1 | * | 3/2003 | Komatsu | ................. 271/10.01 |
| 2004/0207887 | A1 | * | 10/2004 | Makino et al. | .............. 358/496 |
| 2005/0122544 | A1 | * | 6/2005 | Mizuhashi et al. | ......... 358/1.18 |

FOREIGN PATENT DOCUMENTS

| JP | 07-172618 | 7/1995 |
|---|---|---|
| JP | 2002-014495 | 1/2002 |
| JP | 2002-171385 | 6/2002 |

\* cited by examiner

*Primary Examiner*—Patrick Mackey
*Assistant Examiner*—Prasad V Gokhale
(74) *Attorney, Agent, or Firm*—Squire, Sanders & Dempsey L.L.P.

(57) ABSTRACT

An image reading apparatus includes a platen which is set at an image reading position, a loading guide portion which is arranged upstream in a convey direction of an original to be adjacent to the platen and guides the original to an upper surface of the platen, a scoop-up guide portion which is arranged downstream in the convey direction of the original to be adjacent to the glass platen and guides a leading edge of the original, which has passed through the platen, by scooping up, a convey guide portion which is arranged to oppose the platen and scoop-up guide portion, to form a convey path between the convey guide portion and both of the platen and the scoop-up guide portion, a support portion which supports the convey guide portion to be slidable parallel to the platen, and a regulating portion which is arranged between the convey guide portion and the scoop-up guide portion to hold a constant gap between the convey guide portion and the scoop-up guide portion.

14 Claims, 6 Drawing Sheets

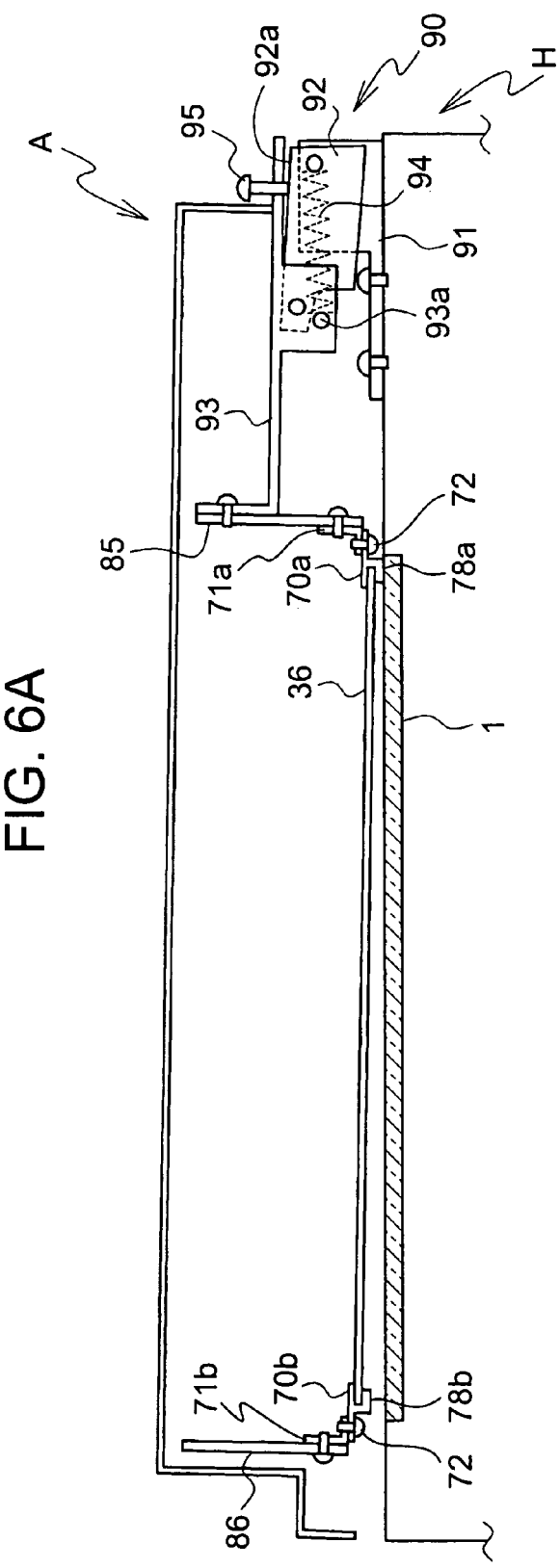
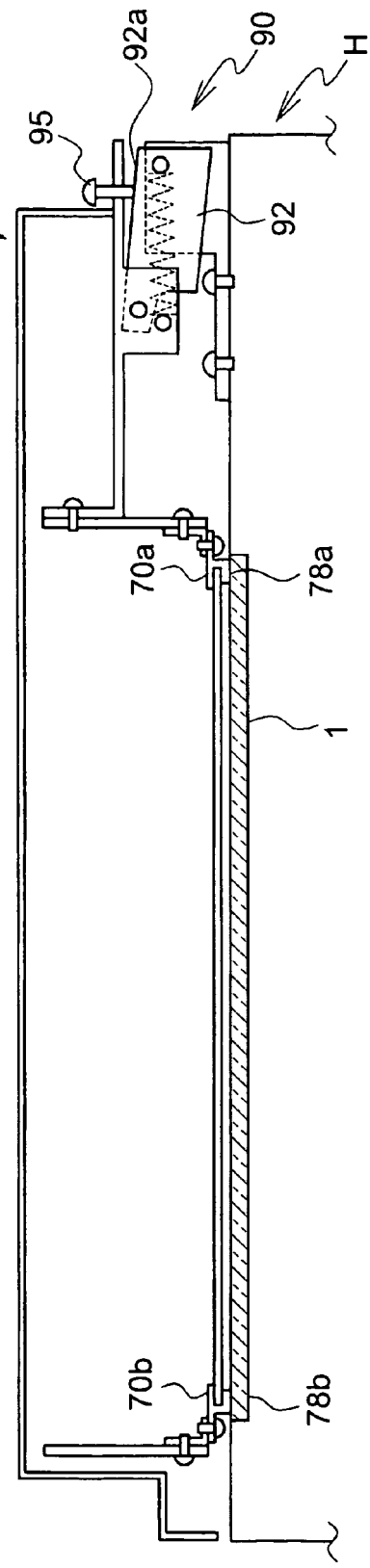

IMAGE READING APPARATUS

This application is based on and claims the priority under 35 U.S.C. § 119 from the Japanese Patent Application No. 2004-241193 filed in Japan on Aug. 20, 2004, the entire content of which is incorporated herein by reference.

BACKGROUND OF THE INVENTION

1. Field of the Invention

The present invention relates to an image reading apparatus including a document (original) feeder for conveying an original (document) automatically and, more particularly, to an improvement in an original guide at a reading position.

2. Description of Related Art

Conventionally, an image reading apparatus such as a digital copying machine, facsimile machine, or image scanner includes a document feeder which sends out a plurality of stacked originals one by one and conveys each original to a reading position automatically. The image reading apparatus directly reads the original fed to the reading position, i.e., by the so-called flow scanning scheme.

An image reading apparatus which employs this flow scanning scheme includes the first glass platen to read each of the originals which are sequentially supplied by the document feeder, and the second glass platen to place a thick original such as a book on it and read the thick original. When the original moves on the first glass platen, it is read by an image reading unit in a still state which uses a photoelectric converting element, e.g., a CCD. When the original is placed on the second glass plate, it is read by moving the image reading unit.

The document feeder is attached to be able to open/close the upper surface of the image reading apparatus. The original placed on a paper feed tray is conveyed onto the first glass platen along a convey path. The original is scooped up by a scoop-up member which is arranged downstream of the first glass platen to be adjacent to it, and delivered onto a delivery tray along a delivery path. In the document feeder, a convey guide which forms a curved convey path between the first glass platen and the scoop-up member is arranged at a position to oppose the upper surface of the first glass platen. This convey guide can move vertically. A projection formed outside the original convey area of the convey guide abuts against the upper surface of the first glass platen to form a convey path having a predetermined gap between the upper surface of the first glass platen and the convey guide (see Japanese Unexamined Patent Publication No. 2002-14495: patent reference 1). Thus, the original is conveyed within the depth of focus of the image reading unit, and stable conveyance of the original at the reading position is ensured.

In the document feeder, even when the gap between the first glass platen and convey guide is regulated to be small, an impact which occurs when the scoop-up member scoops up the original from the first glass platen, the impact which occurs when the original enters delivery rollers, and the impact which occurs when the trailing edge of the original leaves convey rollers may adversely affect the read image to cause problems such as image blur. In particular, when the leading edge of the original abuts against the scoop-up member or delivery rollers, a reaction force in a direction opposite to a convey direction of the original is applied to the original to hold the original momentarily at the reading position. Then, distortion occurs in the read image.

According to a countermeasure proposed to solve these problems, the gap of that portion of the convey path which is downstream of the first glass platen is made as narrow as possible to moderate the impact during original conveyance, thus suppressing image blur or the like (see Japanese Unexamined Patent Publication No. 2002-171385: patent reference 2, and Japanese Unexamined Patent Publication No. 2002-172618: patent reference 3). In particular, in patent reference 2, the scoop-up member arranged on the upper surface of the image reading apparatus at a position adjacent to the first glass platen is supported swingably. A projection formed on the swingable convey guide is made to abut against the scoop-up member.

In the above arrangement of swinging the scoop-up member, if the biasing force of the convey guide toward the scoop-up member is set larger than the biasing force of the scoop-up member toward the convey guide, the convey guide floats from the first glass platen, and a predetermined gap cannot be ensured between the first glass platen and convey guide. If the biasing force of the scoop-up member toward the convey guide is set smaller than the biasing force of the scoop-up member toward the convey guide, when a firm original such as thick paper is conveyed, the scoop-up member swings to hinder the conveyance. In order to prevent this, each time an original is to be conveyed, the biasing forces of the scoop-up member and convey guide must be adjusted, which is cumbersome. When the convey path is curved, the original is conveyed along the outer guide. To swing the scoop-up member which forms part of the outer guide is not preferable when considering the conveyance stability.

SUMMARY OF THE INVENTION

The present invention has been made in view of the above situation, and has as its object to provide an image reading apparatus in which the original conveyance stability while an original passes on a platen set at the original image reading position is improved to suppress blur or distortion of the read image.

In order to achieve the above object, according to the main aspect of the present invention, there is provided an image reading apparatus comprising a platen which is set at an image reading position, a scoop-up guide portion which is arranged downstream in a convey direction of an original to be adjacent to the platen and guides a leading edge of the original, which has passed the platen, by scooping up, a convey guide portion which is arranged to oppose the platen and scoop-up guide portion, to form a convey path between the convey guide portion and both of the platen and scoop-up guide portion, a support portion which supports the convey guide portion to be slidable parallel to the platen, and a regulating portion which is arranged between the convey guide portion and scoop-up guide portion to hold a constant gap between the convey guide portion and scoop-up guide portion.

With the image reading apparatus according to the present invention, constant gaps are always held between the convey guide portion and the platen, and between the convey guide portion and the scoop-up guide portion. Thus, original conveyance is stabilized to obtain a good image.

The above and many other objects, features and advantages of the present invention will become manifest to those skilled in the art upon making reference to the following detailed description and the accompanying drawings in which preferred embodiments incorporating the principle of the present invention are shown by way of illustrative examples.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A and 3B are sectional views showing the support structure of a convey guide unit, in which FIG. 3A shows a state wherein a document feeder A is open from the upper surface of an image reading apparatus main body H, and FIG. 3B shows a state wherein the document feeder A is closed on the upper surface of the image reading apparatus main body H;

FIGS. 6A and 6B show sectional views showing a positioning member in the original widthwise direction of a convey guide member in the convey guide unit, in which FIG. 6A shows a state wherein the convey guide member is inclined with respect to a first glass platen 1, and FIG. 6B shows a state wherein the inclination of the convey guide member with respect to the first glass platen 1 is adjusted.

DETAILED DESCRIPTION OF THE PREFERRED EMBODIMENT

The preferred embodiment of an image reading apparatus according to the present invention will be described in detail with reference to the accompanying drawings.

Figure 1:
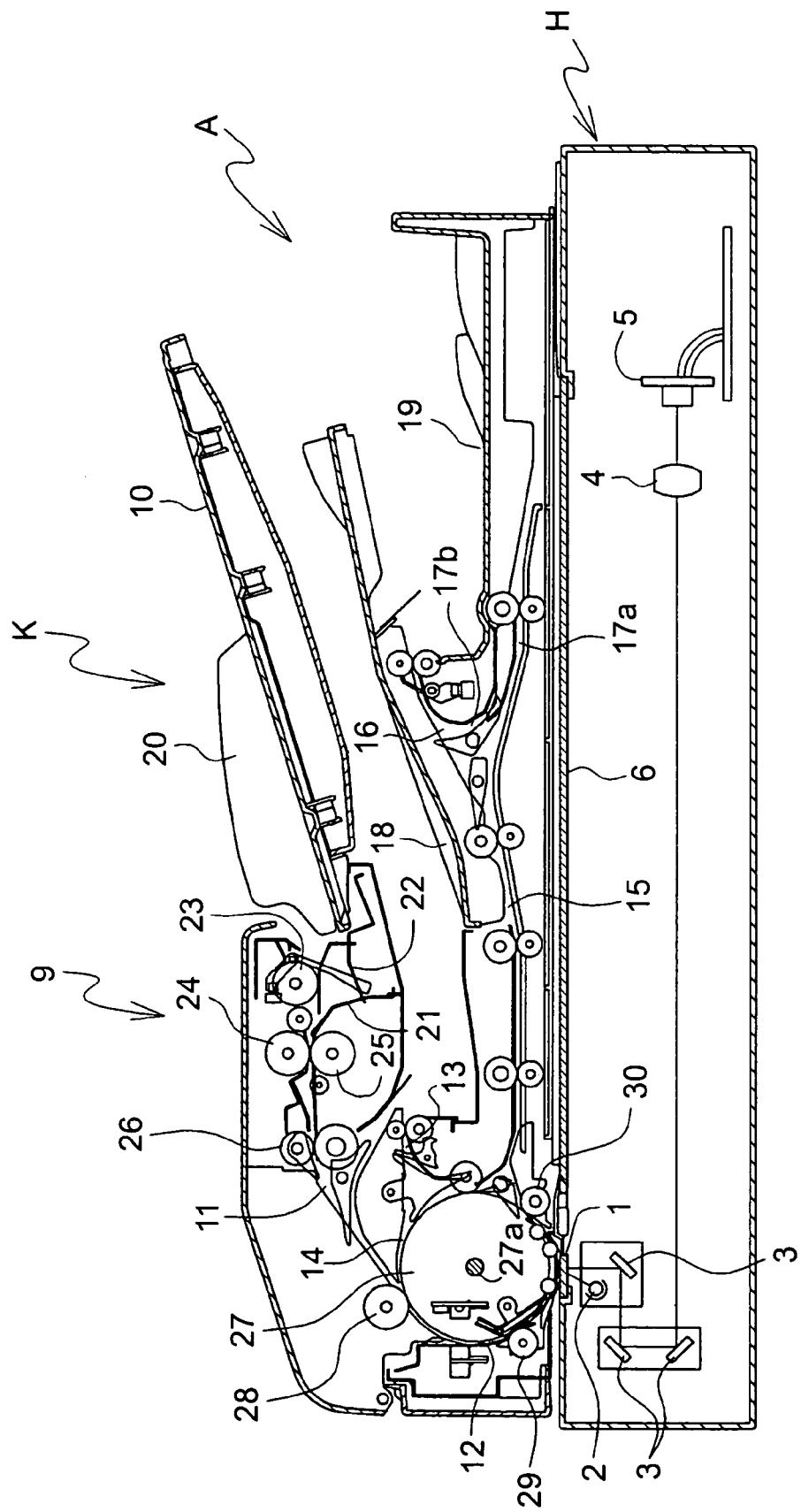
FIG. 1 is a sectional view showing the entire arrangement of an image reading apparatus according to the present invention.

FIG. 1 shows the entire arrangement of an image reading apparatus according to the present embodiment, which includes an image reading apparatus main body H and a document feeder A mounted on it. An original picked up from a paper feeder K of the document feeder A passes the reading position of the image reading apparatus main body H and is delivered onto a delivery tray.

The document feeder A includes the paper feeder K having a paper feed tray 10 for placing a plurality of originals on it, and first and second delivery trays 18 and 19 which store the originals read by the image reading apparatus main body H. The first delivery tray 18 mainly stores large-sized originals, and the second delivery tray 19 stores small-sized originals.

The document feeder A has a plurality of sheet convey paths extending from the paper feeder K to the first and second delivery trays 18 and 19 via the image reading apparatus main body H. First, a paper feed path 11 conveys the original picked up from the paper feed tray 10. A convey path 12 extends from the paper feed path 11 to a first glass platen 1 of the image reading apparatus main body H. A first delivery path 13 continues from the convey path 12 to the delivery port to the first delivery tray 18. Large-diameter convey rollers 27 and a plurality of driven rollers 28, 29, and 30 which are in tight contact with the outer surfaces of the convey rollers 27 are arranged between the convey path 12 and first delivery path 13. The convey rollers 27 are driven by a convey motor (not shown). Numeral 27a denotes the driving shafts of the convey rollers 27. An intermediate path 15 is formed between the convey rollers 27 and second delivery tray 19. A second delivery path 16 continues from the intermediate path 15 to the delivery port of the second delivery tray 19. A switchback path 17a branches from the second delivery path 16 to switch back the original set from the intermediate path 15. A reversal path 17b turns over the switch-backed original and guides it to the delivery port to the second delivery tray 19. A circulation path 14 returns the switch-backed original to the connecting portion of the paper feed path 11 and convey path 12 via the intermediate path 15 and sends it to the convey path 12 again. These sheet convey paths form the original feed path.

The paper feeder K includes the paper feed tray 10 described above and a paper feed unit 9 for picking up the originals one by one from the paper feed tray 10 and conveys them to the paper feed path 11. The paper feed tray 10 is provided with a side guide 20 which regulates the side ends of the originals placed on the paper feed tray 10. A stopper member 21 is arranged in the vicinity of the distal end of the paper feed tray 10 to regulate the leading edges of the originals placed on the paper feed tray 10. The paper feed tray 10 is attached to be pivotal about the leading edge side in the convey direction of the original (to be referred to as an original convey direction).

The paper feed unit 9 includes a pickup roller 23, elevating plate 22, paper feed roller 24, separation roller 25, and registration roller pair 26. The pickup roller 23 sends out the original. The elevating plate 22 lifts up the leading edges of the originals placed on the paper feed tray 10 to bring them into contact with the pickup roller 23. The paper feed roller 24 supplies an original picked up by the pickup roller 23. The separation roller 25 allows only the uppermost one of the originals placed on the paper feed tray 10 to pass through, and inhibits conveyance of the second and following originals. The registration roller pair 26 aligns the supplied originals which are separated by the separation roller 25 by abutting against the leading edges of the originals, and sends them downstream.

In the image reading apparatus main body H, lamp light from a light source 2 irradiates the conveyed original through the first glass platen 1 set at the original reading position. Light reflected by the original is reflected by a plurality of mirrors 3 and photoelectrically converted by a reading device 5, e.g., a CCD, through a lens 4, to read the original image. More specifically, the upper surface of the first glass platen 1 and its vicinity form the reading portion of the image reading apparatus main body H. The image reading apparatus main body H also includes a second glass platen 6 with an area sufficiently wide to place the original on it. When the document feeder A is opened and closed to place a thick original such as a book on the second glass platen 6, a light source unit including the light source 2, mirrors 3, and the like is moved in the subscanning direction to read the original image through the second glass platen 6.

Figure 2:
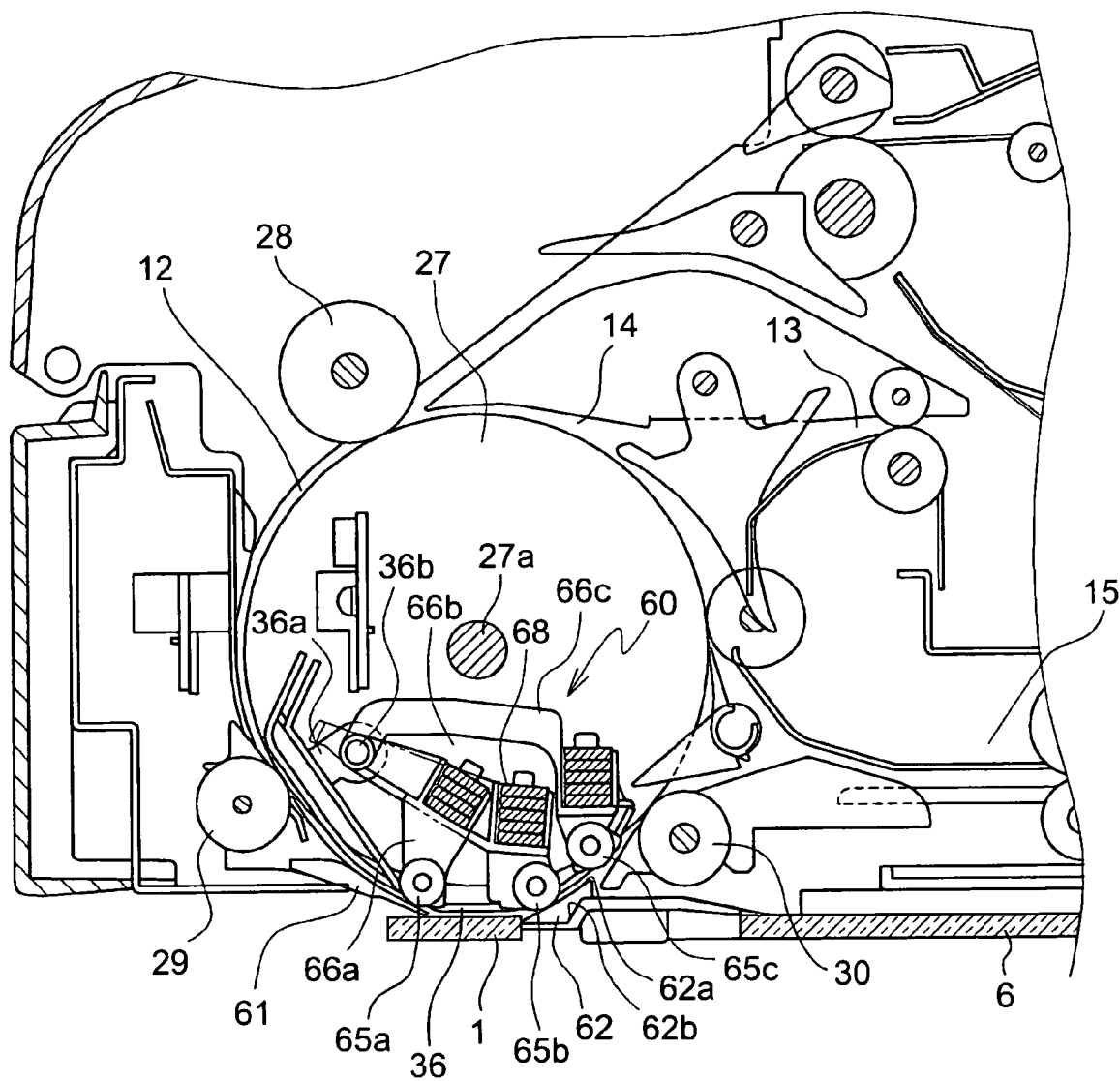
FIG. 2 is a sectional view showing the arrangement of the main part of the image reading apparatus according to the present embodiment.
Figure 3A:
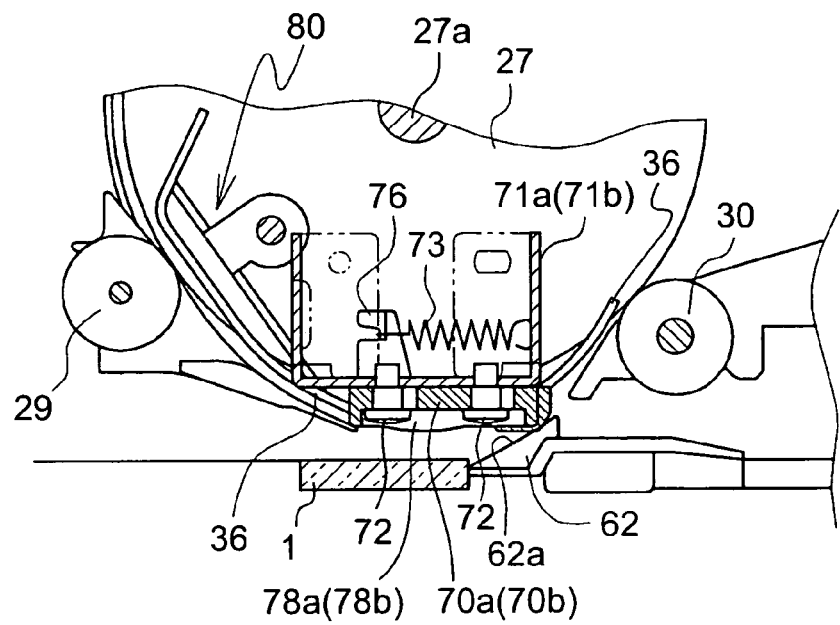
Figure 3B:
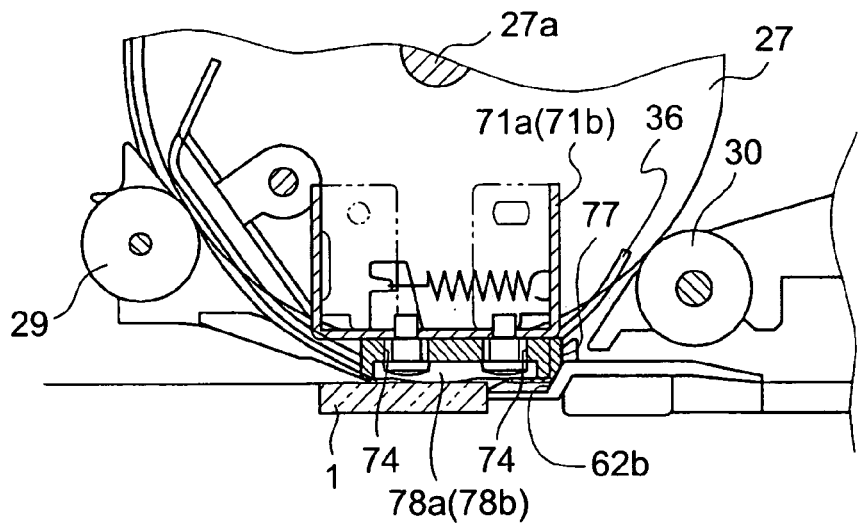
Figure 4:
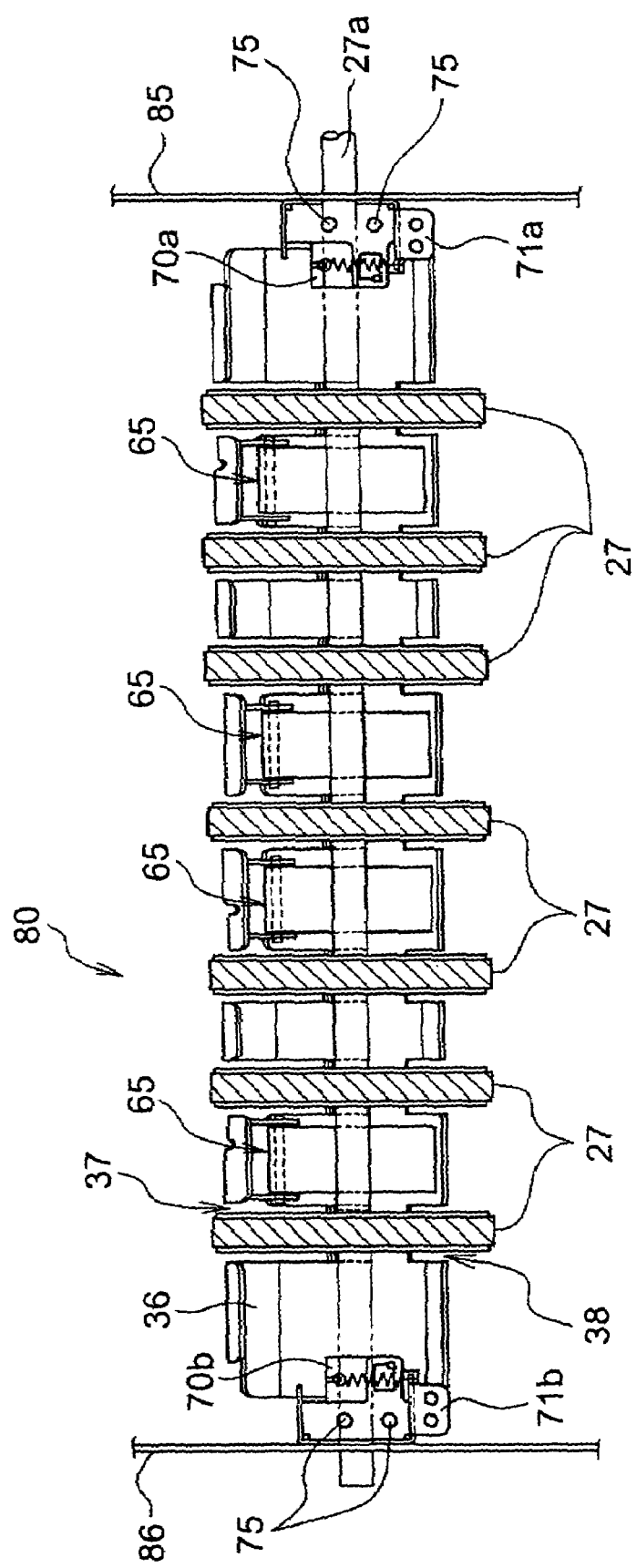
FIG. 4 is a plan view showing the arrangement of the convey guide unit and support structures at the two ends of the convey guide unit.

FIG. 2 is an enlarged sectional view of the main part of the image reading apparatus shown in FIG. 1 according to the present embodiment. FIGS. 3A and 3B are sectional views showing the support structure of a convey guide unit 80. FIG. 4 is a plan view showing the arrangement of the convey guide unit 80 and support structures at the two ends of the convey guide unit 80.

Referring to FIG. 2, the convey path 12 formed in the vicinity of the first glass platen 1 is provided with a reading portion 60. The reading portion 60 reads the original within a segment extending from the driven roller 29 located upstream of the first glass platen 1 in the original convey direction to the driven roller 30 downstream in the original convey direction.

The reading portion 60 includes the first glass platen 1, a scoop-up guide member 62, a loading guide member 61, and a convey guide member 36. The scoop-up guide member 62 scoops up the original from the first glass platen 1 and guides it to the first delivery path 13 or intermediate path 15 downstream in the original convey direction. The loading guide member 61 guides the original conveyed by the convey rollers 27 and driven roller 29 onto the upper surface of the first glass platen 1. The convey guide member 36 is arranged to oppose the loading guide member 61, first glass platen 1, and scoop-up guide member 62, and forms part of the convey path 12 together with them. A plurality of floating wheels 65a, 65b, and 65c are arranged, on the convey guide member 36 side of the reading portion 60, in the vicinity of the bent portion of the convey path 12. The floating wheels 65a, 65b, and 65c project into the convey path 12 and form floating wheel sets 65 (to be described later).

As shown in FIGS. 2, 3A, and 3B, the scoop-up guide member 62 is arranged downstream of the first glass platen 1 in the original convey direction to be adjacent to it. An original guide surface 62a is formed on the upper surface of the scoop-up guide member 62 to scoop up upward the original which has passed the first glass platen 1. The original guide surface 62a is arranged such that its one end on the first glass platen 1 side is lower than the upper surface of the first glass platen 1. The original guide surface 62a is formed to have a larger width than the maximum original width along a direction (to be referred to as an original widthwise direction) perpendicular to the original convey direction. Abutting surfaces 62b are inclinedly formed, at positions outside the original guide surface 62a, on the two ends in the original widthwise direction of the scoop-up guide member 62. Regulating members 70a and 70b abut against the abutting surfaces 62b to regulate and hold a constant gap between the convey guide member 36 (to be described later) and the original guide surface 62a of the scoop-up guide member 62.

As shown in FIGS. 3A, 3B, and 4, the convey guide member 36 is formed of a curved plate-like member which extends long in the original widthwise direction. The plate-like member has notches 37 and 38 to correspond to the positions of the convey rollers 27. At the left and right ends of the convey guide member 36, the regulating members 70a and 70b are arranged at the two ends in the original widthwise direction of the convey guide member 36, to sandwich the ends of the convey guide member 36 vertically.

Vertically extending elongated holes 74 are formed at two, front and rear portions of each of the regulating members 70a and 70b. The elongated holes 74 are wide in the original convey direction, and stepped screws 72 are inserted in them respectively. Support members 71a and 71b are respectively fixed to left and right side plates 85 and 86 of the apparatus main body, and placed on the upper surfaces of the regulating members 70a and 70b, respectively. The distal ends of the stepped screws 72 are respectively fitted in retaining holes 75 formed in the support members 71a and 71b. Therefore, the convey guide member 36 can slide with respect to the support members 71a and 71b in the back-and-forth direction parallel to the first glass platen 1 within the ranges allowed by the elongated holes 74, that is, along the original convey direction. Locking pieces 76 project from the upper surfaces of the respective regulating members 70a and 70b. Tension springs 73 extend between the locking pieces 76 and the support members 71a and 71b which are located downstream of the locking pieces 76 in the original convey direction. The tension springs 73 serve to constantly bias the regulating members 70a and 70b toward the scoop-up guide member 62. The regulating members 70a and 70b form a convey guide unit 80 which is integral with the convey guide member 36 and the plurality of floating wheel sets 65. Thus, the convey guide unit 80 is constantly biased toward the scoop-up guide member 62. According to this embodiment, first regulating portions 77 are formed at the respective ends of the regulating members 70a and 70b which are located on the scoop-up guide member 62 side, to abut against the abutting surfaces 62b of the scoop-up guide member 62. The first regulating portions 77 are resin members which are formed on those opposite surfaces of the regulating members 70a and 70b which abut against at least the abutting surfaces 62b of the scoop-up guide member 62. When the first regulating portions 77 abut against the abutting surfaces 62b, a constant gap is held between the convey guide member 36 and the original guide surface 62a of the scoop-up guide member 62. Second regulating portions 78a and 78b are formed on the lower surfaces of the two ends in the original widthwise direction of the regulating members 70a and 70b. The second regulating portions 78a and 78b abut against the upper surface of the first glass platen 1 to regulate the direction of height of the document feeder A with respect to the upper surface of the image reading apparatus main body H, and regulate and hold the gap between the upper surface of the first glass platen 1 and the convey guide member 36.

Therefore, as shown in FIG. 3A, when the document feeder A is open from the upper surface of the image reading apparatus main body H, the convey guide unit 80 is biased in the original convey direction by the operations of the tension springs 73 respectively applied between the regulating members 70a and 70b and the support members 71a and 71b, and the ends of the elongated holes 74 formed in the regulating members 70a and 70b are regulated by the steps of the stepped screws 72. In this state, when the document feeder A is moved toward the upper surface of the image reading apparatus main body H, that is, when the document feeder A is closed, the first regulating portions 77 of the regulating members 70a and 70b abut against the abutting surfaces 62b of the scoop-up guide member 62, and the convey guide unit 80 slides upstream in the original convey direction.

When the second regulating portions 78a and 78b of the regulating members 70a and 70b abut against the upper surface of the first glass platen 1, downward movement of the document feeder A is regulated, and the document feeder A is closed on the upper surface of the image reading apparatus main body H. At this time, as shown in FIG. 3B, the second regulating portions 78a and 78b abut against the first glass platen 1 to regulate the gap between the first glass platen 1 and the opposing lower surface of the convey guide member 36 to about 1 mm. As the first regulating portions 77 abut against the abutting surfaces 62b of the scoop-up guide member 62 to slide the convey guide unit 80, the portion between the original guide surface 62a of the scoop-up guide member 62 and the opposing lower surface of the convey guide member 36 is also regulated to a small gap of about 1 mm. In other words, when the document feeder A is closed, the convey guide member 36 is positioned in the vertical direction by the second regulating portions 78a and 78b, and in the horizontal direction by the first regulating portions 77.

Figure 5:
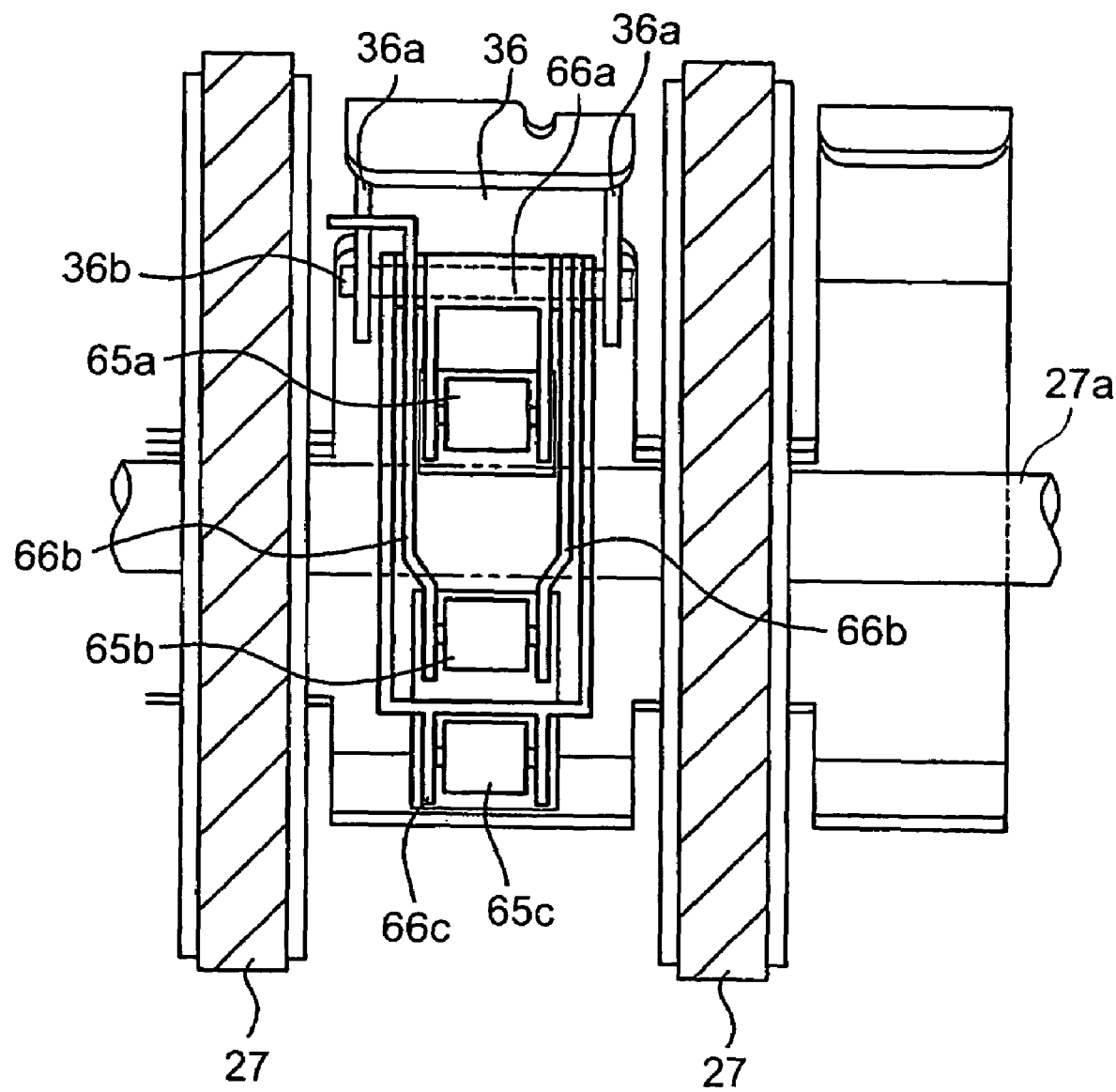
FIG. 5 is a plan view showing the arrangement of floating wheels.

According to this embodiment, as shown in FIGS. 4 and 5, the plurality of floating wheel sets 65 each comprising the three floating wheels 65a, 65b, and 65c are arranged among the plurality of convey rollers 27. In this embodiment, two floating wheel sets 65 are arranged at uniform outward portions from the center of the original convey region in the original widthwise direction of the convey guide member 36 as a reference. Two pairs of two floating wheel sets 65 are arranged in the original convey direction, leading to a total of four floating wheel sets 65. As shown in FIG. 2, of each floating wheel set 65, the floating wheels 65a, 65b, and 65c are arranged sequentially from the upstream side in the original convey direction. In more detail, the floating wheel 65a is arranged in the vicinity of a bent portion which is immediately before the original is loaded onto the upper surface of the first glass platen 1. The floating wheel 65b is arranged in the vicinity of a bent portion where the original is scooped up from the upper surface of the first glass platen 1. The floating wheel 65c is arranged in the vicinity of a bent portion where the original is guided from the original guide surface 62a of the scoop-up guide member 62 to the upstream guide of the driven roller 30. As shown in FIGS. 2 and 5, each floating wheel set 65 is swingably supported by arm members 66a, 66b, and 66c which extend from the convey guide member 36 to support the respective floating wheels 65a, 65b, and 65c from the two sides. The proximal ends of the arm members 66a, 66b, and 66c are pivotally attached to a pivot pin 36b which is fixed to a bent portion 36a formed by inwardly bending the upstream side of the convey guide member 36. Weights 68 are attached to the arm members 66a, 66b, and 66c to swingably bias the floating wheels 65a, 65b, and 65c toward the convey path 12. The weights 68 are adjusted to have appropriate biasing forces for the respective floating wheels 65a, 65b, and 65c. As shown in FIG. 2, when each weight 68 is formed by stacking a plurality of small weight pieces, the weight of the weight 68 can be adjusted easily.

As described above, since the floating wheel sets 65 are arranged in the vicinities of the respective bent portions near the reading portion 60, a press force is applied to the original, being conveyed to the reading portion 60, in such a manner that conveyance is not hindered. Thus, fluttering of the original near the reading portion 60 is suppressed effectively. Naturally, the number of positions to set the floating wheels is not limited to three of the above embodiment, and the positions to set the floating wheels can be determined in accordance with the bent portions.

Inclination adjustment of the convey guide member 36 in the original widthwise direction with respect to the first glass platen 1 will be described with reference to FIGS. 6A and 6B. The inclination of the convey guide member 36 is adjusted by a hinge device 90 with which the document feeder A is pivotally supported on the image reading apparatus main body H. The hinge device 90 includes an attaching member 91, pivot member 92, and lift member 93. The attaching member 91 is fixed to the upper surface of the image reading apparatus main body H. One end of the pivot member 92 is pivotally, axially supported by the attaching member 91. The lift member 93 is pivotally, axially supported on the free end of the pivot member 92. The lift member 93 has an actuation pin 93a at a position different from the position where the lift member 93 is axially supported by the pivot member 92. A compression spring 94 extends between the actuation pin 93a and attaching member 91. One side plate of the document feeder A is attached to one end of the lift member 93, and the lift member 93 supports the document feeder A. The two side plates 85 and 86 of the document feeder A are integrally connected to each other through a connection member (not shown) such as a stay. More specifically, the hinge device 90 pivots the pivot member 92 with the operation of the compression spring 94 in a direction to separate from the attaching member 91, biases the free end of the lift member 93 toward the pivot member 92, and supports the document feeder A to be able to open from and close on the upper surface of the image reading apparatus main body H. An adjustment screw 95 is provided to the free end side of the lift member 93 of the hinge device 90. The adjustment screw 95 abuts against a rear surface 92a of the pivot member 92 to adjust the inclination of the document feeder A. When the inclination of the document feeder A is adjusted by the adjustment screw 95, the second regulating portions 78a and 78b of the regulating members 70a and 70b provided to the two ends in the original widthwise direction of the convey guide member 36 reliably abut against the upper surface of the first glass platen 1, and a constant gap is always regulated and held between the first glass platen 1 and convey guide member 36.

More specifically, as shown in FIG. 6A, assume that due to a dimensional error, an assembly error, or distortion of the apparatus, or errors in respective members or the like, one (78a) of the second regulating portions 78a and 78b which regulate the height of the document feeder A attached to the hinge device 90 unevenly abuts against the upper surface of the first glass platen 1, and the document feeder A, i.e., the convey guide member 36, is set inclinedly. In this case, the adjustment screw 95 of the hinge device 90 is rotated, and the document feeder A is pivoted about the position of the second regulating portion 78a, which abuts unevenly, as a fulcrum, so that the distance between the rear surface 92a of the pivot member 92 and the free end of the lift member 93 increases. As shown in FIG. 6B, the inclination of the document feeder A is adjusted such that the other second regulating portion 78b also reliably abuts against the upper surface of the first glass platen 1. With this adjustment, when the document feeder A is closed, the respective second regulating portions 78a and 78b at the two ends of the regulating members 70a and 70b reliably abut against the upper surface of the first glass platen 1, and the preset gap is always regulated and held between the first glass platen 1 and convey guide member 36.

The arrangement of the embodiment described above has the following operations and effects.

First, the position in the vertical direction of the convey guide member 36 is fixed by the adjustment screw 95 provided to the hinge device 90 such that the constant gap is always held between the first glass platen 1 and convey guide member 36. Subsequently, in this state, the first regulating portions 77 is abutted against the abutting surfaces 62b of the scoop-up guide member 62 to slide the convey guide member 36 in the horizontal direction. As a result, constant gaps can be always regulated and held between the first glass platen 1 and the lower surface of the convey guide member 36, and between the original guide surface 62a of the scoop-up guide member 62 and the lower surface of the convey guide member 36. Thus, the original can be conveyed stably. This can suppress an adverse effect of an impact to the read image, which is generated when the leading edge of the original abuts against the guide or rollers.

In the reading portion 60, the plurality of floating wheel sets 65 are arranged in the vicinities of the respective bent portions of the convey path. The floating wheels 65a, 65b, and 65c of each floating wheel set 65 are swingably supported by the arm members 66a, 66b, and 66c independently of each other. Variations in biasing forces can be adjusted by the weights 68. Therefore, the original convey load is decreased, and fluttering of the original can be eliminated. This enables stable original conveyance. As a result, the adverse effect of an impact to the read image, which is generated when the leading edge of the original abuts against the guide or roller, can be suppressed.

What is claimed is:

1. An image reading apparatus comprising:
a platen which is set at an image reading position;
a scoop-up guide portion which is arranged downstream in a convey direction of an original to be adjacent to the platen and guides a leading edge of the original, which has passed through the platen, by scooping up;
a convey guide portion which is arranged to oppose the platen and scoop-up guide portion, to form a convey path between the convey guide portion and both the platen and the scoop-up guide portion;
a support portion which supports the convey guide portion to be slidable parallel to the platen; and a regulating portion which is arranged between the convey guide portion and the scoop-up guide portion to hold a constant gap between the convey guide portion and the scoop-up guide portion.

2. An apparatus according to claim 1, wherein the regulating portion slides the convey guide portion to hold the constant gap between the convey guide portion and the scoop-up guide portion.

3. An apparatus according to claim 1, wherein the support portion has biasing member for constantly biasing the convey guide portion toward the scoop-up guide portion.

4. An apparatus according to claim 3, wherein the support portion supports the convey guide portion through the regulating portion such that the convey guide portion slides against a biasing force of the biasing member.

5. An apparatus according to claim 1, wherein the regulating portion comprises a regulating member which is connected to either one of the convey guide portion and the scoop-up guide portion and abuts against the other one of the convey guide portion and the scoop-up guide portion.

6. An apparatus according to claim 1, wherein the convey guide portion comprises
a floating wheel set including a plurality of floating wheels which are arranged in vicinities of bent portions, before and after the image reading position of the platen, of the convey path,
a swinging member for swingably supporting the plurality of floating wheels, and
a biasing member for biasing the plurality of floating wheels toward the convey path.

7. An apparatus according to claim 6, wherein
the swinging member comprises an arm member having a pivot fulcrum on an upstream side of the floating wheels, and
the biasing member comprises a weight-adjustable weight.

8. An apparatus according to claim 1, wherein an adjusting member is provided for adjusting and holding inclination of the convey guide portion in a direction perpendicular to the convey direction of the original, so that a predetermined parallel gap is formed between the platen and convey guide portion.

9. An apparatus according to claim 1, wherein the regulating portion includes a first regulating portion which positions the convey guide portion in a vertical direction, and a second regulating portion which positions the convey guide portion in a horizontal direction.

10. An apparatus according to claim 9, wherein the regulating portion contacts the scoop-up guide portion through the second regulating portion.

11. An apparatus according to claim 1, wherein an original guide surface of said scoop-up guide portion is formed such that one end thereof on the platen side is lower than an upper surface of the platen, and is wider than a maximum original width along an original widthwise direction perpendicular to the convey direction of the original.

12. An apparatus according to claim 1, wherein at two ends in an original widthwise direction of the scoop-up guide portion, inclined abutting surfaces against which the regulating portion abuts are formed at outer positions of an original guide surface.

13. An apparatus according to claim 1, wherein the regulating portion is provided at both ends in the direction perpendicular to the convey direction of the original.

14. An apparatus according to claim 1, comprising a loading guide portion which is arranged upstream in the convey direction of the original to be adjacent to the platen and guides the original to the platen.

* * * * *